(12) United States Patent
Upreti et al.

(10) Patent No.: US 8,260,623 B2
(45) Date of Patent: Sep. 4, 2012

(54) SYSTEMS AND METHODS FOR SELECTING FLOUR

(75) Inventors: Praveen Upreti, Orchard Park, NY (US); Rohit Jalali, Ridgeway (CA); William E. Grieshober, Jr., East Amherst, NY (US); John S. Roberts, Honeoye Falls, NY (US); Melissa D. Haller, Orchard Park, NY (US); Michael Fuchs, Clarence, NY (US); Ilya Y. Ilyin, Brookline, MA (US)

(73) Assignee: Rich Products Corporation, Buffalo, NY (US)

(*) Notice: Subject to any disclaimer, the term of this patent is extended or adjusted under 35 U.S.C. 154(b) by 78 days.

(21) Appl. No.: 12/435,286

(22) Filed: May 4, 2009

(65) Prior Publication Data

US 2009/0276268 A1    Nov. 5, 2009

Related U.S. Application Data

(60) Provisional application No. 61/050,091, filed on May 2, 2008.

(51) Int. Cl.
*G06Q 10/00* (2006.01)
*G06F 17/00* (2006.01)

(52) U.S. Cl. .......... 705/1.1; 705/400

(58) Field of Classification Search .......... 426/241, 426/242, 243, 244, 522, 463, 531, 549, 622, 426/665, 443, 465, 231; 73/169; 705/400, 705/1.1, 7.11, 29, 30; 99/485, 493, 646 R, 99/486, 488; 700/36, 33, 32, 28, 1, 108, 700/109; 366/150.1, 151.1

See application file for complete search history.

(56) References Cited

U.S. PATENT DOCUMENTS

| | | | | |
|---|---|---|---|---|
| 4,786,182 | A * | 11/1988 | Larsen | 366/140 |
| 5,033,004 | A * | 7/1991 | Vandivier, III | 700/103 |
| 5,105,767 | A * | 4/1992 | Gordon et al. | 119/57.92 |
| 5,906,851 | A | 5/1999 | Smith | |
| 6,532,420 | B1 * | 3/2003 | Haeffner et al. | 702/22 |
| 6,745,131 | B2 * | 6/2004 | Haeffner et al. | 702/22 |
| 2003/0084791 | A1 * | 5/2003 | Trenhaile et al. | 99/486 |
| 2004/0019434 | A1 | 1/2004 | Tedeschi et al. | |
| 2008/0003340 | A1 | 1/2008 | Karwowski et al. | |

FOREIGN PATENT DOCUMENTS

| | | | |
|---|---|---|---|
| WO | 0195219 A1 | 12/2001 | |
| WO | 03082016 A1 | 10/2003 | |

* cited by examiner

*Primary Examiner* — Igor Borissov
(74) *Attorney, Agent, or Firm* — Hodgson Russ LLP (57) ABSTRACT

Flour may be treated to denature the proteins and modify starches. The invention includes methods and systems for determining whether to use treated flour or untreated flour. The invention also includes methods and systems for determining whether to treat flour or not.

29 Claims, 8 Drawing Sheets

| Symbol | Meaning |
| --- | --- |
| C | Cost |
| M | Margin |
| t.f. | Heat-Treated Flour |
| f. | Regular Flour (not heat-treated) |
| sup. | Supplier |
| cus. | Customer |
| W | Weight of flour per unit of the final product (e.g. per lbs of frozen dough or bread) |
| f.t. | Flour Treatment |
| proc. | processing |
| rm. | raw material |

SYSTEMS AND METHODS FOR SELECTING FLOUR

CROSS-REFERENCE TO RELATED APPLICATION

This application claims the benefit of priority to U.S. provisional patent application Ser. No. 61/050,091, filed on May 2, 2008.

FIELD OF THE INVENTION

The present invention relates to the use of flour to produce goods, such as baked goods. Specifically, the present invention may be embodied as a method or system for selecting between treated flour and non-treated flour, or for determining whether or not to treat flour.

BACKGROUND OF THE INVENTION

The characteristics of flour, such as wheat flour, can be modified via processing the flour. For example, the capacity of flour to absorb water can be modified by denaturing the proteins and modifying the starch of the flour. Such a modification can be achieved by heating the flour at elevated temperatures for some length of time. Heat treated flour can absorb more water after heat treatment than it can before being heat treated.

It may be possible to use other methods of modifying the characteristics of flour. For example, it may be possible to denature the proteins and modify the starch of the flour by the use of ozone or irradiation. However, general aspects of the invention will be illustrated herein by focusing on the heat treatment of flour. The skilled person will recognize that the invention may be employed in situations where the flour is modified by means other than through the use of heat.

Heat treated flour can absorb more water than non-heat treated flour. Therefore, the recipes for products made from heat treated flour are often different from the recipes for the same product made from non-heat treated flour. For example, when manufacturing a certain volume of a final product, the amount of flour in the final product (e.g. frozen dough or baked bread) can be reduced by up to 3.2% when heat treated flour is used. Considering the recent price increases for non-heat treated flour, this provides significant opportunity to reduce cost.

The supply chain corresponding to flour and the products produced with flour may include many entities. Among those entities are the wheat grower, grain/flour processor, bakery product manufacturer, retailer/food service, and final consumer.

Processors are usually large suppliers of grain, flour, and other commodities that are used by product manufacturers. Processors often manage the storage of grain and flour, and will usually grind the grain into flour. In this document, we will sometimes refer to a processor as a "supplier".

Product manufacturers add value by making finished products (e.g. fully baked bread) that are shipped to retailers or consumers, and/or intermediate products (e.g. frozen dough) that can more easily be made into a final product. Finished products and intermediate products are sometimes collectively referred to herein as "final products". In this document, we will sometimes refer to a manufacturer as a customer, since they are typically a direct customer of a supplier.

Below are descriptions of methods that may be used to select between types of flour, in order to maximize the profit of a business entity. One such method is applicable to a supplier, and another such method is applicable to a customer.

SUMMARY OF THE INVENTION

The invention may be embodied as a method of selecting between heat treated flour and non-heat treated flour. In one such method, a microprocessor is provided and programmed to determine a customer margin differential ("CMD"). The CMD is a measure of the difference between a customer's margin when using non-heat treated flour and when using heat treated flour. The CMD may be determined as follows: (a) determine a cost ("C1") of non-heat treated flour, which may be equal to $C.f. \times W.f.$, where C.f. is the cost of non-heat treated flour per unit weight, and W.f. is the weight of non-heat treated flour per unit of final product; (b) determine a cost ("C2") of treated flour, which may be equal to $C.t.f. \times W.t.f.$, where C.t.f. is the cost of treated flour per unit weight, and W.t.f. is the weight of treated flour per unit of final product; (c) determine a cost differential ("C3") of other components (such as water, salt and other non-flour ingredients), which is equal to the cost of non-flour components used to make the final product when non-heat treated flour is used minus the cost of non-flour components used to make the final product when treated flour is used; (d) determine a cost differential ("C4") of processing costs, which is equal to the manufacturing cost of producing the final product with non-heat treated flour minus the cost of producing the final product with treated flour; (e) determine the CMD, which is equal to $C1 - C2 + C3 + C4$.

It should be noted that C.f. and C.t.f. may include a number of types of costs, including transportation costs. With respect to transportation costs, heat treated flour, in general, has lower moisture than the untreated flour, and therefore heat treated flour is expected to cost less to transport.

Once the CMD is determined, the programmed microprocessor may be operated so that the CMD is determined. Then a determination may be made as to whether the CMD is a positive number, and if the CMD is determined to be a positive number, then an indication may be provided to indicate that selection of heat treated flour is advisable. The microprocessor may be programmed and operated to determine whether the CMD is a positive number. If non-heat treated flour is currently being used, and the indication is to use heat treated flour, it may be prudent to require that the CMD be at or above a threshold value because the costs of switching from non-heat treated flour to heat treated flour may need to be recouped.

In such a method, a determination may be made as to the expected weight of the treated flour per unit of final product (W.t.f.). Such a determination may be made by (a) predicting a change in absorption due to heat treatment and (b) scaling W.f. according to the change in absorption to provide W.t.f.

In addition, a determination may be made as to whether the CMD is a negative number, and if the CMD is determined to be a negative number, then an indication may be provided to indicate that selection of non-heat treated flour is advisable. If heat treated flour is currently being used, and the indication is to use non-heat treated flour, it may be prudent to require that the CMD be at or above a threshold value (that is to say that the absolute value of the CMD is at or above the threshold value) because the costs of switching from heat treated flour to non-heat treated flour may need to be recouped.

In a method according to the invention, a change in absorption may be determined and used to predict the change in the amount of flour that will be realized by heat treating, versus not heat treating the flour. The change in absorption may be determined by a microprocessor programmed to subtract an absorption value for non-heat treated flour from a predicted absorption value for heat treated flour. The microprocessor may be programmed to determine the predicted absorption value for heat treated flour by determining absorption A, where A is:

$$A = A_e - (A_e - A_o)10^{\left[\frac{-t}{D_r \cdot 10^{(T_r - T/z)}}\right]}$$

wherein
A=absorption
$A_o$=initial absorption
$A_e$=maximum absorption achieve at a given temperature and protein content flour:

$$A_e = A_o + 3.2632 e^{0.0044T}$$

Dr=reference decimal value which is 27 min at 260° F. to increase absorption by 90% or one log-cycle
Tr=reference temperature of 260° F.
T=heat treatment temperature between 250-330° F.
z=167° F. and is the temperature change necessary to change the D-value by 90% or one-log cycle.

The invention also may be embodied as a system for selecting between heat treated flour and non-heat treated flour. One such system has a microprocessor that is programmed to determine the CMD. The microprocessor may be programmed to carry out the method outlined above. The system also includes an input device capable of receiving C.f., W.f., C.t.f., and/or W.t.f. and providing these values to the microprocessor, and an output device, which is capable of displaying an indication that heat treated flour is selected if the signal is provided. The microprocessor also may be programmed to predict W.t.f. in the manner outlined above.

Furthermore, the microprocessor may be programmed to determine whether the CMD is a negative number, and to provide a non-heat treat signal indicating that flour should not be heat treated if the CMD is negative. In that system, the output device is capable of displaying an indication that the flour should not be heat treated if the non-heat treat signal is provided. If heat treated flour is currently being used, and the indication is to use non-heat treated flour, it may be prudent to require that the CMD be at or above a threshold value (that is to say that the absolute value of the CMD is at or above the threshold value) because the costs of switching from heat treated flour to non-heat treated flour may need to be recouped.

The invention also may be embodied as a method of determining whether to heat treat flour. In one such method, a microprocessor is provided and programmed to determine a customer margin differential ("CMTD"). The CMTD is a measure of the difference between a customer's margin when using non-heat treated flour and when using heat treated flour. The CMTD may be obtained as follows: (a) determine an incremental cost ("C1"), which is equal to C.f.×(W.f.−W.t.f.), where C.f. is the cost of non-heat treated flour per unit weight, and W.f. is the weight of non-heat treated flour per unit of final product, and W.t.f. is the weight of treated flour per unit of final product; (b) determine a cost ("C2") of treating flour, which is equal to C.f.t.×W.t.f., where C.f.t. is the cost of heat treating the flour per unit weight, and W.t.f. is the weight of treated flour per unit of final product; (c) determine a cost differential ("C3") of other components, which is equal to the cost of non-flour components used to make the final product when non-heat treated flour is used minus the cost of non-flour components used to make the final product when treated flour is used; (d) determine a cost differential ("C4") of processing costs, which is equal to the manufacturing cost of producing the final product with non-heat treated flour minus the cost of producing the final product with treated flour; (e) determine the CMTD, which is equal to C1−C2+C3+C4.

Once the CMTD is determined, the programmed microprocessor may be operated so that the CMTD is determined. Then a determination may be made as to whether the CMTD is a positive number, and if the CMTD is determined to be a positive number, then an indication may be provided to indicate a determination to heat treat flour is advisable. The microprocessor may be programmed and operated to determine whether the CMTD is a positive number. If non-heat treated flour is currently being used, and the indication is to use heat treated flour, it may be prudent to require that the CMTD be at or above a threshold value because the costs of switching from non-heat treated flour to heat treated flour may need to be recouped.

In such a method a determination may be made as to the expected weight of the treated flour per unit of final product (W.t.f.). Such a determination may be made by (a) predicting a change in absorption due to heat treatment and (b) scaling W.f. according to the change in absorption to provide W.t.f. The change in absorption may be determined by using the method outlined above.

In addition, a determination may be made as to whether the CMTD is a negative number, and if the CMTD is determined to be a negative number, then an indication may be provided to indicate a determination not to heat treat is advisable.

The invention also may be embodied as a system for determining whether to heat treat flour. One such system has a microprocessor that is programmed to determine the CMTD. The microprocessor may be programmed to carry out the method outlined above. The system also includes an input device capable of receiving C.f., W.f., C.t.f., and/or W.t.f. and providing these values to the microprocessor, and an output device capable of indicating a determination to treat flour by displaying an indication that flour should be heat treated if the signal is provided. The microprocessor also may be programmed to predict W.t.f. in the manner outlined above.

Furthermore, the microprocessor may be programmed to determine whether the CMTD is a negative number, and to provide a non-heat treat signal indicating that flour should not be heat treated if the CMTD is negative. In that system, the output device is capable of displaying an indication that the flour should not be heat treated if the non-heat treat signal is provided.

The method may be embodied as a method of manufacturing a final product from flour and non-flour components. Two such embodiments are described herein—one focused on the CMD and another focused on the CMTD. In the CMD version, the CMD is calculated, and then a treated-flour recipe is selected if the CMD is positive, or a non-treated-flour recipe is selected for the final product if the CMD is negative. In the CMTD version, the CMTD is calculated, and then a treated-flour recipe is selected if the CMTD is positive, or a non-treated-flour recipe is selected for the final product if the CMTD is negative. Then, the final product is manufactured according to the selected recipe.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

The present invention may be embodied as a method of selecting between two types of flour. For example, one type of flour may be standard wheat flour, which has not been heat treated, and another type of flour is heat treated wheat flour. Although the invention is illustrated herein by characterizing the choice as being between heat treated and non-heat treated flour, the invention may be applied more broadly. For example, the choice may be between flour having different protein content, or may be between flour originating from a first particular type of wheat, and flour originating from a second particular type of wheat.

The present invention may also be embodied as a system for carrying out the method. For example, the system may include a computer having a microprocessor that is programmed to determine between two types of flour.

The invention is illustrated via two examples. The first example is a model that can be used by a supplier to decide whether flour should be heat treated. The second example is a model that can be used by a customer (a.k.a manufacturer) to decide whether heat treated flour should be used to create a product.

Model for the Supplier

A supplier can benefit from heat treating flour if the supplier allows the customer to realize savings that would not be realized if the customer uses non-heat treated flour. In order for a customer to choose to use heat treated flour, the cost to the customer of using heat treated flour must be less than the cost to the customer of using non-heat treated flour.

A mathematical model has been created with the following assumptions in mind:
1. The supplier will be able to use this model to evaluate their margin and set the price for treated flour.
2. The supplier will need to optimize its margin (profit) from providing heat treated flour so that the customer (e.g. a dough or bread producer) has the same or higher margin after changing to heat treated flour that the customer had when using regular flour.
3. The price and quality of the final product (e.g. the dough or bread) after changing from regular flour to heat treated flour remains the same for the end user, whether that end user is a consumer of a retail outlet or a consumer of a food service establishment.

Figure 1:
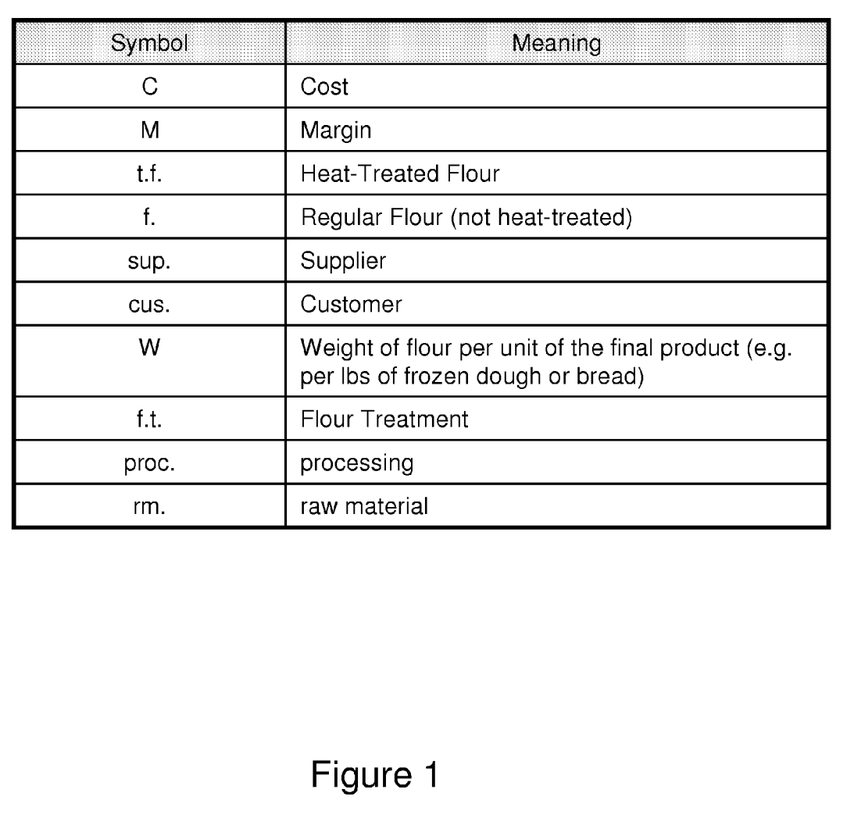
FIG. 1 is a key defining certain abbreviations.
Figure 2:
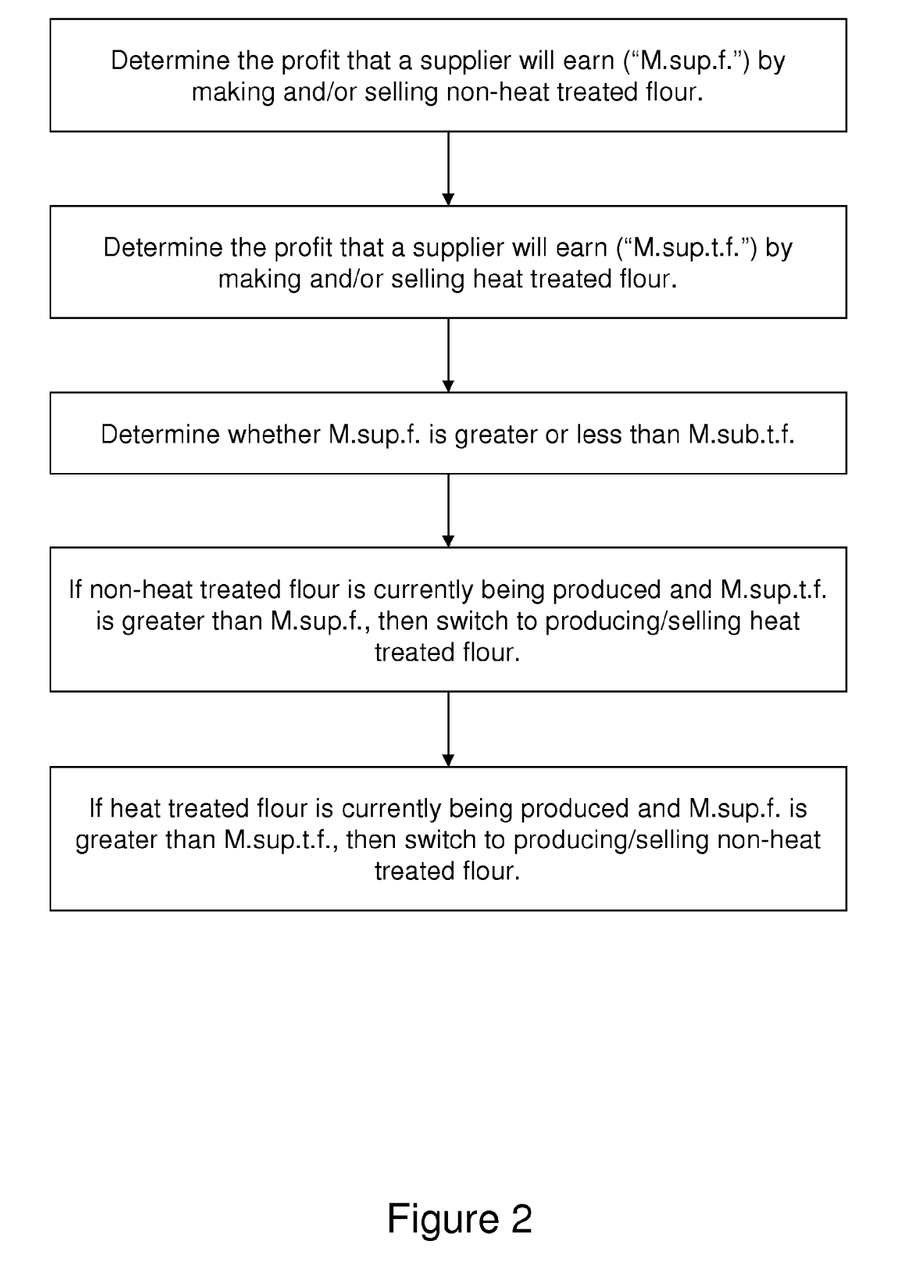
FIG. 2 is a flow chart depicting steps of a method that is in keeping with the supplier model of the invention.
Figure 3:
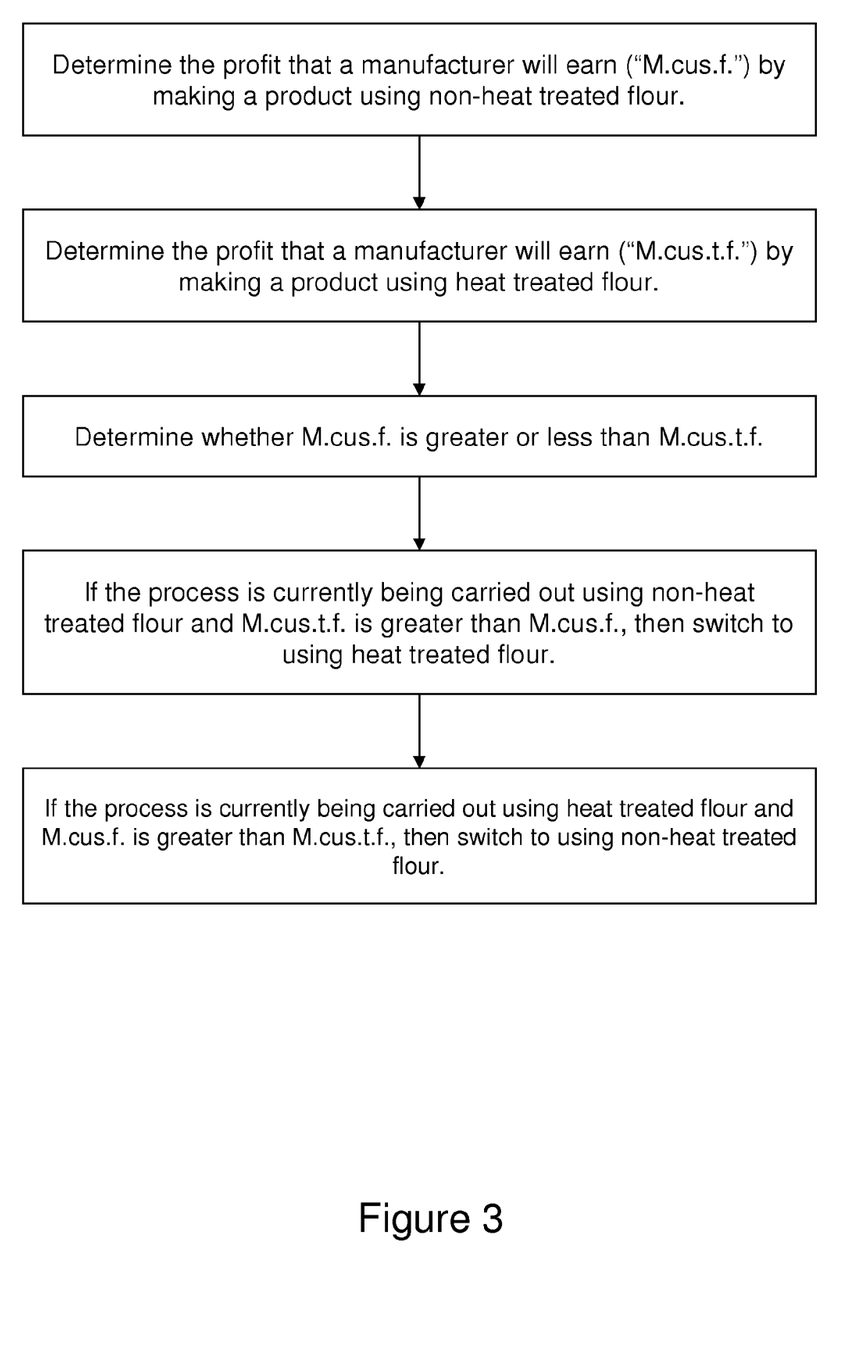
FIG. 3 is a flow chart depicting steps of a method that is in keeping with the customer model of the invention.

FIG. 1 is a key for the equations which follow. A basic equation for the price of the final product made of regular flour is:

$$\text{Price of the fin.prod.} = C.f.*W.f \text{ in prod.} + C.\text{other comp.prod}.f + C.\text{cus}.f + M.\text{cus}.f.$$

The term C.f. stands for the cost per unit weight of the non-heat treated flour that the customer pays to the supplier. C.f. may be the sum of three components: (1) cost ("C.rm".) paid by the supplier for the raw material (e.g. grain) per unit weight of flour, (2) cost ("C.sup.f".) per unit weight of flour paid by the supplier to process the raw material into non-heat treated flour (grinding, transporting, storing, etc.), and (3) the margin (profit) that the supplier expects to earn ("M.sup.f".) per unit weight of non-heat treated flour.

The term "W.f. in prod". represents the weight of the flour in the final product that is made with non-heat treated flour. From time to time, the term "W.f". is substituted for the lengthier term.

The term "C.other comp.f". stands for the cost of other components in the final product that is made with non-heat treated flour. For example, the cost of salt, water or preservatives.

The term "C.cus.f". stands for the customer's cost of transforming the flour into a final product that is made with non-heat treated flour.

The term "M.cus.f". stands for the customer's margin (profit) that the customer expects to earn from selling the final product.

In keeping with the third assumption (above), we assume that the price of the final product should remain the same regardless of whether the flour is heat treated or non-heat treated. With that assumption in mind, for heat treated flour the equation will change to:

$$\text{Price of the fin.prod.} = (C.t.f.)*W.t.f. \text{ in prod.} + C.\text{other comp.prod}.t.f. + C.\text{cus}.t.f. + M.\text{cus}.t.f.$$

The cost of the treated flour ("C.t.f".) is the cost of the heat treated flour on a per-unit-weight basis that the customer pays to the supplier for heat treated flour. The value of C.t.f. may depend on (1) cost ("C.rm".) paid by the supplier for the raw material (e.g. grain) per unit weight of flour, (2) cost ("C.sup.t.f".) per unit weight of flour paid by the supplier to process the raw material into heat treated flour (grinding, transporting, storing, heating etc.), and (3) the margin (profit) that the supplier expects to earn ("M.sup.t.f".) per unit weight of heat treated flour. It should be noted that the supplier can have a value for M.sup.t.f. that is different from M.sup.f.

The term "C.other comp.t.f". stands for the cost of other components in the final product that is made with heat treated flour. For example, the cost of salt, water or preservatives.

The value of C.sup.t.f. may include the cost ("C.f.t".) per unit weight of heat treating the flour may be included. Also, the value of C.f.t. may include an estimate of the cost to change from using non-heat treated flour to using heat treated flour, and that estimate is assumed to be provided on a per-unit-weight basis. For example, if equipment must be purchased, cleaned, or moth-balled in order to move from a non-heat treatment mode to a heat treatment mode of operation, then the amortized cost of such activities may be included in C.f.t. Such amortization may be done based on the amount of heat-treated flour that is expected to be produced before switching back to a mode of operation in which non-heat treated flour is produced.

As noted above, the weight of the heat treated flour in an amount of the final product ("W.t.f. in prod".) will decrease due to the denaturing caused by heat treatment. Offsetting this reduction in the quantity of flour used to produce a final product, is the expectation that the cost of heat treated flour per unit weight (C.t.f.) will be higher than the cost of non-heat treated flour (C.f.).

Solving the equations above yields the following:

$$M.cus.f = \text{Price of the fin.prod.} - C.f.*W.f. \text{ in prod.} - C.\text{other comp. prod}.f. - C.cus.f.$$

$$M.cus.t.f. = \text{Price of the fin.prod.} - (C.t.f.)*W.t.f. \text{ in prod.} - C.\text{other comp.prod}.t.f. - C.cus.t.f.$$

It will make sense for a customer to change from non-heat treated flour to heat treated flour if: M.cus.f.<M.cus.t.f., which may be rewritten as: 0<M.cus.t.f.−M.cus.f. If we define the difference in these customer margins as ΔM.cus., then using the equations above, we can say that:

$$0 < \Delta M.cus. = M.cus.t.f. - M.cus.f. = C.f.*W.f \text{ in prod.} + C.\text{other comp. prod}.f. + C.cus.f. - (C.t.f.)*W.t.f. \text{ in prod.} - C.\text{other comp.prod}.t.f. - C.cust.t.f.$$

which can be written as:

$$0 < \Delta M.cus. = C.f.*W.f. - C.t.f.*W.t.f. + \Delta C.\text{other comp. prod}.f/t.f. + \Delta C.cus.f./t.f.$$

If the forgoing condition is true, then it may make sense for the customer to switch to treated flour provided by the supplier. This equation may be thought of as a condition for a supplier to select the margin for treated flour—if conditions are right, then the customer will have a positive increase in their margin by changing over to treated flour provided by the supplier. If non-heat treated flour is currently being used, and the indication is to use heat treated flour, it may be prudent to require that the CMD be at or above a threshold value because the costs of switching from non-heat treated flour to heat treated flour may need to be recouped.

Having analyzed the situation from the customer's viewpoint, let us analyze the situation from the supplier's viewpoint. The change to heat treated flour may be profitable for the supplier if: M.sup.t.f.*W.t.f.−M.sup.f.*W.f.>0, where M.sup.t.f. and M.sup.f. are on a per unit weight basis. Here we are looking to increase the supplier's margin per unit of the final product, not unit of flour, since we need to consider both the higher margin obtained by a sale of heat treated flour and the reduced demand for non-heat treated flour.

As noted above, C.f. may be equal to C.rm.+C.sup.f.+M.sup.f. Thus, the equation:

$$\text{Price of the fin.prod.} = C.f.*W.f. + C.\text{other comp. prod}.f. + C.cus.f. + M.cus.f.,$$

which may be rewritten as:

$$\text{Price of the fin.prod.} = (C.rm. + C.sup.f. + M.sup.f.)*W.f. + C.\text{other comp. prod}.f. + C.cus.f. + M.cus.f.$$

Also noted above, C.t.f. may be equal to C.rm.+C.sup.t.f.+M.sup.t.f. Therefore, the equation $$\text{Price of the fin.prod.} = (C.t.f.)*W.t.f. + C.\text{other comp.prod}.t.f. + C.cust.t.f. + M.cus.t.f$$

may be rewritten as:

$$\text{Price of the fin.prod.} = (C.rm. + C.sup.f. + M.sup.t.f.)*W.t.f. + C.\text{other comp.prod}.t.f. + C.cust.t.f. + M.cus.t.f.$$

Solving these equations for M.sup.f. and M.sup.t.f. yields:

$$M.sup.f.*W.f. = \text{Price fin.prod.} - (C.rm. + C.sup.f.)*W.f. - C.\text{other comp. prod}.f. - C.cus.f. - M.cus.f.$$

$$M.sup.t.f.*W.t.f. = \text{Price of the fin.prod.} - (C.rm. + C.sup.t.f.)*W.t.f. - C.\text{other comp.prod}.t.f. - C.cust.t.f. - M.cus.t.f.$$

Consequently, using the criteria (above) for the supplier to prefer heat treated flour (0<Msup.t.f.*W.t.f.−Msup.f.*Wf), and denoting that as ΔM.sup., the supplier will prefer to sell heat treated flour if:

$$0 < \Delta M.sup. = (C.rm. + C.sup.f.)*W.f. + C.\text{other comp. prod}.f. + C.cus.f. + M.cus.f. - (C.rm. + C.sup.t.f.)*W.t.f. - C.\text{other comp.prod}.t.f. - C.cus.t.f. - M.cus.t.f.$$

which can be rewritten as:

$$0 < \Delta M.sup. = C.rm\Delta W. + C.sup.f.*W.f. - C.sup.t.f.*W.t.f. + \Delta C.\text{other comp.} + \Delta C.cus. + \Delta M.cus.$$

where the symbol "Δ" represents the change in a variable between using non-heat treated flour and using heat treated flour. For example, the term ΔW.=W.f.−W.t.f.

If we assume that ΔM.cus. is slightly above zero, then we may neglect ΔM.cus. to find the point at which the supplier would be interested in switching from non-heat treated flour to heat treated flour.

When both ΔM.cus. and ΔM.sup. are greater than zero, then changing from non-heat treated flour to heat treated flour makes sense for both the supplier and customer. If either ΔM.cus. or ΔM.sup. is not greater than zero, then either the supplier or the customer will resist changing, and instead prefer to supply/use non-heat treated flour.

All parameters in the model can be known and set except for the margins and the cost of flour (C.f.). The cost of regular flour (C.f.) is expected to change over time.

Model for the Customer

The customer may have three modes of operation, and it is assumed the customer will seek to minimize the cost of flour in the final product. The three modes of operation are: (1) use regular (non-heat treated) flour, (2) purchase heat treated flour from a supplier, or (3) heat treat the flour in-house. Here, the input parameters will be (a) price for the non-heat treated flour, (b) price of the heat treated flour from the supplier, and (c) cost of performing heat treatment in-house. Using these parameters, one of the three modes of operation may be selected based on the following models. Each of the models is based on the following assumptions:

1. The customer will use this model to make a choice between the three options and make a decision regarding the economic efficiency to perform flour treatment in-house before investing in the equipment.
2. The customer will select the best option based on the maximum available margin.
3. The price of the final product (dough/bread) for retail/food service/consumer after changeover from regular flour to heat-treated flour remains the same.

The first mode or operation may be represented by the following equation, which seeks to determine the price of the final product if regular (non-heat treated) flour is used:

$$\text{Price of the fin.prod.} = C.f.*W.f. \text{ in prod.} + C.\text{other comp}.f. + C.cus.f. + M.cus.f.$$

Here C.f. is the cost per unit weight of non-heat treated flour that the customer pays to the supplier. C.f. is assumed to include the supplier's raw material cost, supplier's processing costs, and the supplier's margin (profit).

The term "W.f. in prod". represents the weight of the flour in the final product that is made with non-heat treated flour. From time to time, W.f. is substituted for the lengthier term.

The term "C.other comp.f". stands for the cost of other components in the final product that is made with non-heat treated flour.

The term "C.cus.f". stands for the customer's cost of transforming the flour into a final product that is made with non-heat treated flour.

The term "M.cus.f". stands for the customer's margin (profit) that the customer expects to earn.

In the second mode of operation may be represented by the following equation, which seeks to determine the price of the final product if the customer buys heat treated flour from the supplier:

Price of the fin.prod.=C.t.f.*W.t.f. in prod.+C.other comp.t.f.+C.cust.t.f.+M.cus.t.f.

Here C.t.f. means the cost of treated flour from a supplier, and W.t.f. is the weight of the treated flour in the final product. The customer's cost of processing the treated flour (C.cust.t.f.) includes the cost per unit weight of flour to switch from using non-heat treated flour to heat treated flour.

In the third mode of operation may be represented by the following equation, which seeks to determine the price of the final product if the customer heat treats the flour in-house:

Price of the fin.prod.=(C.f.+C.f.t.)*W.t.f. in prod.+C.other comp.t.f.+C.cust.t.f.+M.cus.self t.f.

Here the term C.f. is the cost of regular flour from a supplier. C.f.t. is the cost of flour treatment by a customer, and may include:

Start up cost for a flour treatment line per unit of treated flour. This value can be calculated in a manner that is similar to the changeover cost.

Capital cost per unit of treated flour. If projected consumption of treated flour is small, the cost is very high since capital investment will be spread over a small amount of flour. It means that to make these calculations useful, a forecast will need to be made regarding the expected demand for heat treated flour during the depreciation time and divide capital cost by that amount (similar to the evaluation of C.f.t. in the previous model)

Using the equations above, the decision between using heat treated flour from the supplier and using non-heat treated flour from the supplier should be made based on the following:

0<M.cus.t.f.−M.cus.f.=C.f*W.f.−C.t.f.*W.t.f.+C.other comp.f−C.other comp.t.f.+C.cus.f−C.cus.t.f.

which can be rewritten as:

0<M.cus.t.f.−M.cus.f.=C.f*W.f.−C.t.f.*W.t.f.+ΔC.other comp.+ΔC.cus.

If the change in the margin is positive and conditions are right, then it makes sense to switch from regular flour to treated flour from the supplier. It can happen only if the cost of regular flour is high enough.

In order to decide whether to purchase heat treated flour from the supplier or heat treat the flour in-house, the following equation, which is derived from the equations above, may be used:

0<M.cus.self t.f.−M.cus.f.=C.f.*(W.f.−W.t.f.)−C.f.t.*W.t.f.+C.other comp.f−C.other comp.t.f.+C.cus.f−C.cus.t.f.

which can be rewritten as:

0<M.cus.self t.f.−M.cus.f.=C.f.*(W.f.−W.t.f.)−C.f.t.*W.t.f.+ΔC.other comp.+ΔC.cus.f.

If this condition is true, then it makes sense for the customer to use treated flour, and to perform the treatment themselves.

From the statement we know that it makes sense to use treated flour from the supplier when 0<M.cus. is true. From the statement we know that it makes sense to use treated flour that has been treated by the customer when 0<M.cus.self t.f. is true. There may be instances in which it makes sense to use treated flour, regardless of who treats the flour. In those situations, the customer has a choice between treating the flour themselves, and purchasing the treated flour from the supplier. If the following is true: 0<Ctf−Cft−Cf then it makes sense for the customer to treat the flour themselves.

Although embodiments of the invention have been described herein, the invention is not limited to such embodiments. For example, the invention may be carried out not merely to decide which type of flour should be used, but alternatively may be used to decide which type of flour should be preferred. In this manner, both types of flour may be produced by a supplier or used by a customer, but to varying degrees depending on the information obtained by using the equations.

It was noted above that heat treated flour can absorb more water after heat treatment than it can before being heat treated. Consequently, recipes for products made from heat treated flour are often different from the recipes for the same product made from non-heat treated flour. For example, when manufacturing a certain volume of a final product, the amount of flour in the final product can be reduced by about 3.2% when heat treated flour is used. It should be clear from the discussion above that the reduction in flour used in a recipe to produce a final product will influence the decision regarding whether to heat treat. As such, being able to quantify the increase in absorption obtained by heat treatment may be helpful in deciding whether to use heat treated or non-heat treated flour.

We have found that a single set of kinetic parameters along with an initial absorption value may be sufficient to produce a good predictor of the increase in absorption that can be obtained by heat treating flour. For example, we have found that for flour made from hard wheat and having a protein content between 9 and 14%, the following equation can be used to predict the absorption after heat treatment:

$$A = A_e - (A_e - A_o)10^{\left[\frac{-t}{D_r \cdot 10^{(T_r - T/z)}}\right]}$$

Where
A=absorption
$A_o$=initial absorption
$A_e$=maximum absorption achieve at a given temperature and protein content flour:

$$A_e = A_o + 3.2632 e^{0.0044T}$$

Dr=reference decimal value which is 27 min at 260° F. to increase absorption by 90% or one log-cycle
Tr=reference temperature of 260° F.
T=heat treatment temperature between 250-330° F.
z=167° F. and is the temperature change necessary to change the D-value by 90% or one-log cycle.

Once the predicted absorption value for the treated flour is determined, a scaling factor may be used to determine the weight of flour that will be needed in the final product when treated flour is used. For example, if the predicted absorption A of heat treated flour is 5% higher than the absorption value for non-heat treated flour, then it may be predicted that the weight of treated flour needed to produce a final product will be 5% less than the weight of flour needed to produce a final product using non-heat treated flour. By knowing the weight of treated flour needed to produce a final product, it is possible to determine, via the methods outlined above, whether treated or non-heat treated flour should be used.

To this point, we have focused on heat treatment where the end goal is to increase absorption of the flour so that less flour is used to produce a product. There may be other reasons to heat treat flour. Another reason to heat treat flour may be to increase other performance parameters (i.e. stability) of lower protein flour. So, for example, if a company is using an expensive flour with a protein content of 13%, the company may find it more profitable to either utilize less flour by heat treating the 13% flour, or incorporating a relatively inexpensive flour with a lower protein content (say 12%) that has been heat treated. If using heat treated lower protein flour, the goal would be only to heat treat to a level where the absorption reaches that of the untreated higher protein flour, which could be an increase of as much as 5-6%. For example, an non-heat treated 13% protein flour may have an absorption of 65% and an untreated 12% protein flour has only a 59% absorption. Interestingly, once the desired absorption has been reached on the heat treated lower protein flour, the stability may have increased to a level that would be acceptable to a bakery.

Also, to this point, we have discussed heat treatment that occurs at a temperature where denaturing the proteins and modifying the starch of the flour occurs. Regulations and/or good business practices may mandate heat treatment of flour for other reasons. For example, there may be reasons to elevate the temperature of flour to a temperature below that at which denaturing occurs. For example, in order to kill certain organisms, such as salmonella, the temperature of the flour may be raised. If flour is to be subjected to such heat treatment, then the incremental cost associated with heat treatment for purposes of denaturing is the cost that should be used in determining whether to prefer heat treated flour over non-heat treated flour.

Figure 4:
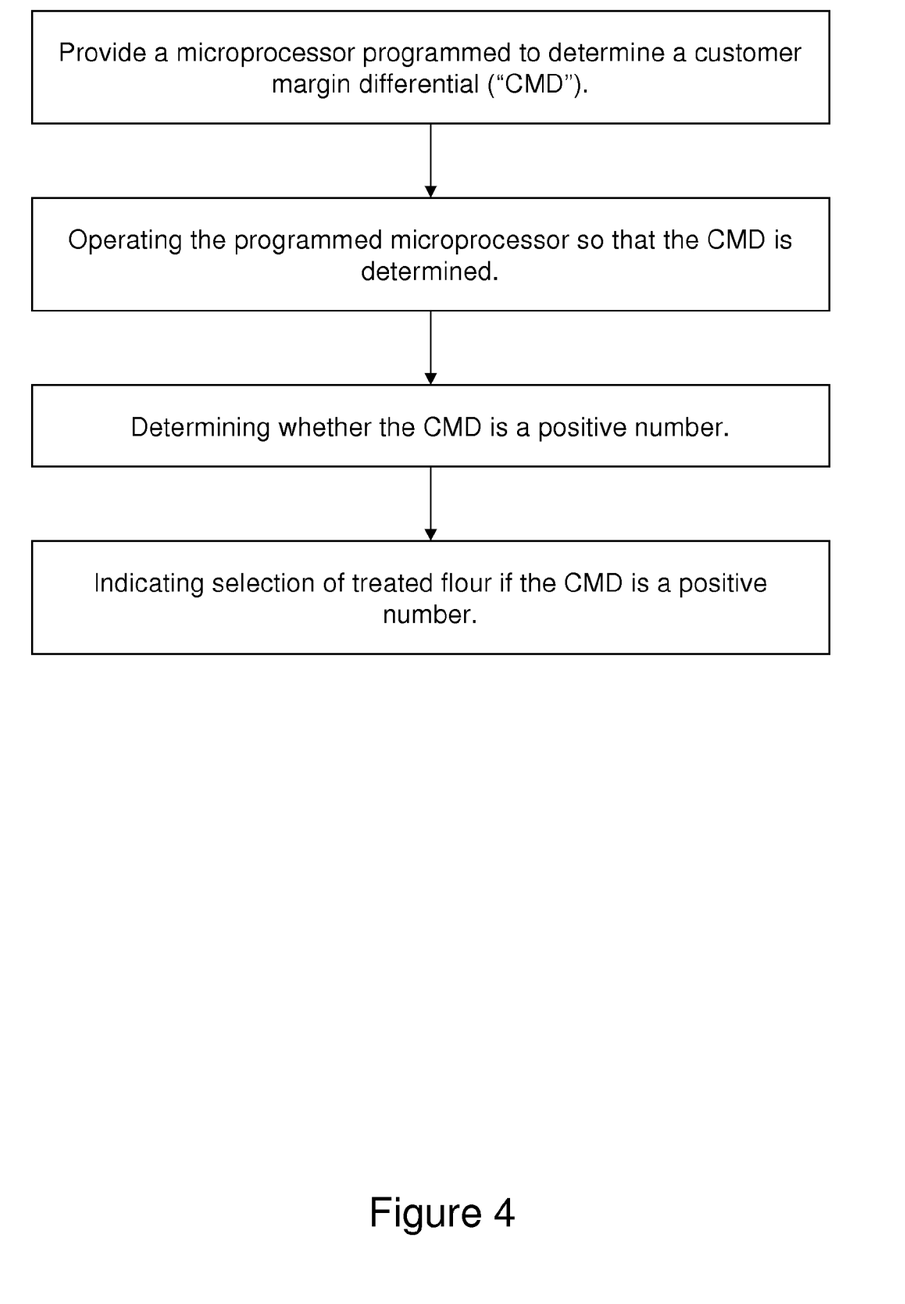
FIG. 4 is a flow chart depicting steps of a method that is in keeping with the supplier model of the invention
Figure 5:
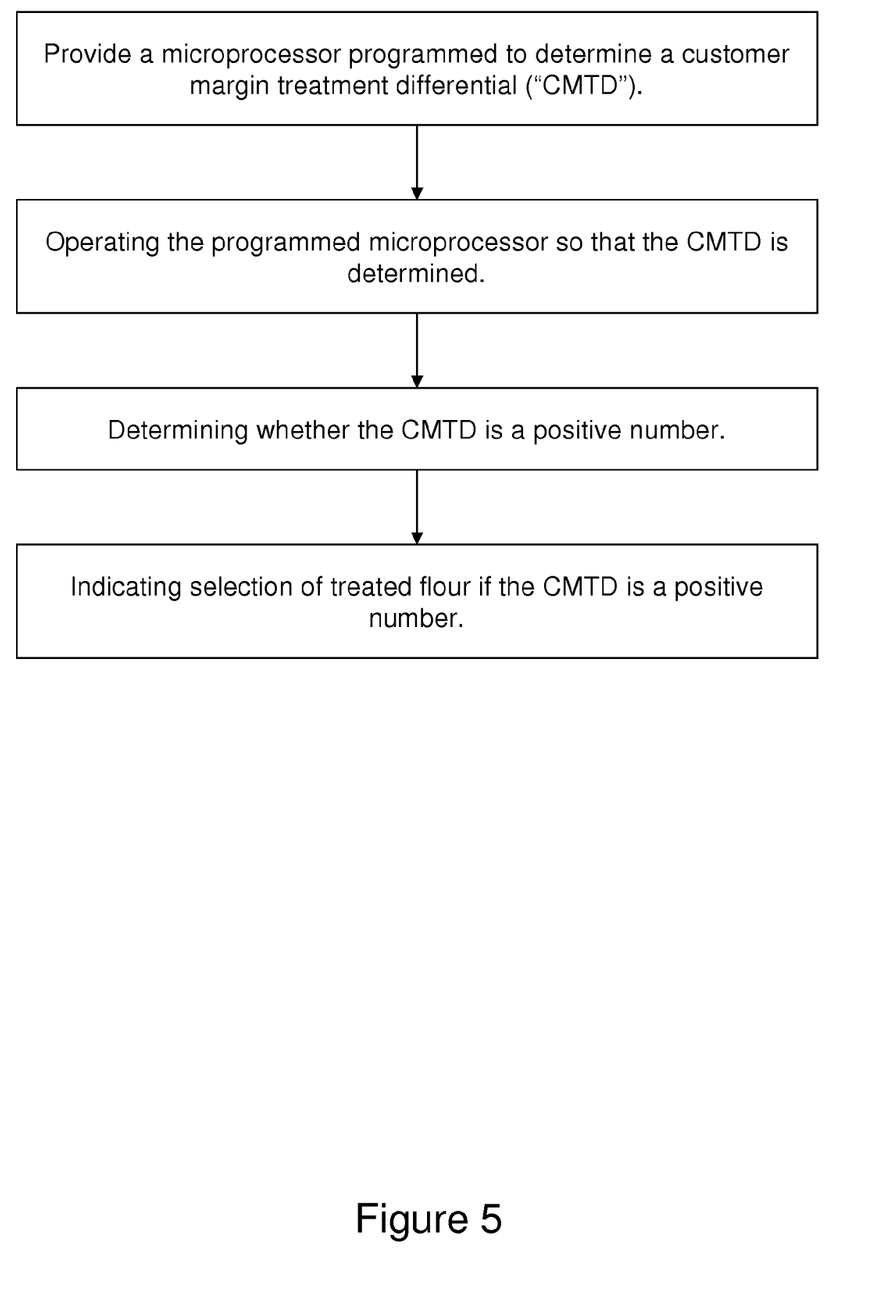
FIG. 5 is a flow chart depicting steps of a method that is in keeping with the customer model of the invention.
Figure 6:
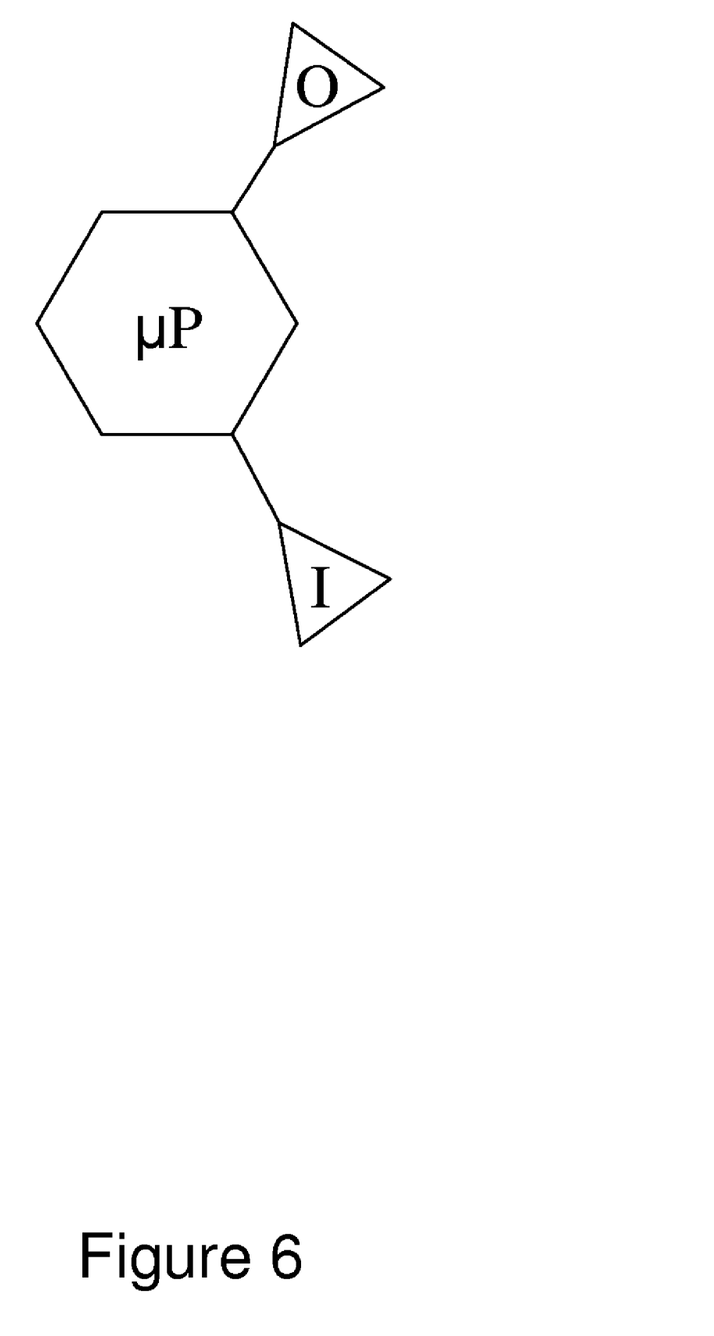
FIG. 6 is a schematic depiction of a system according to the invention.
Figure 7:
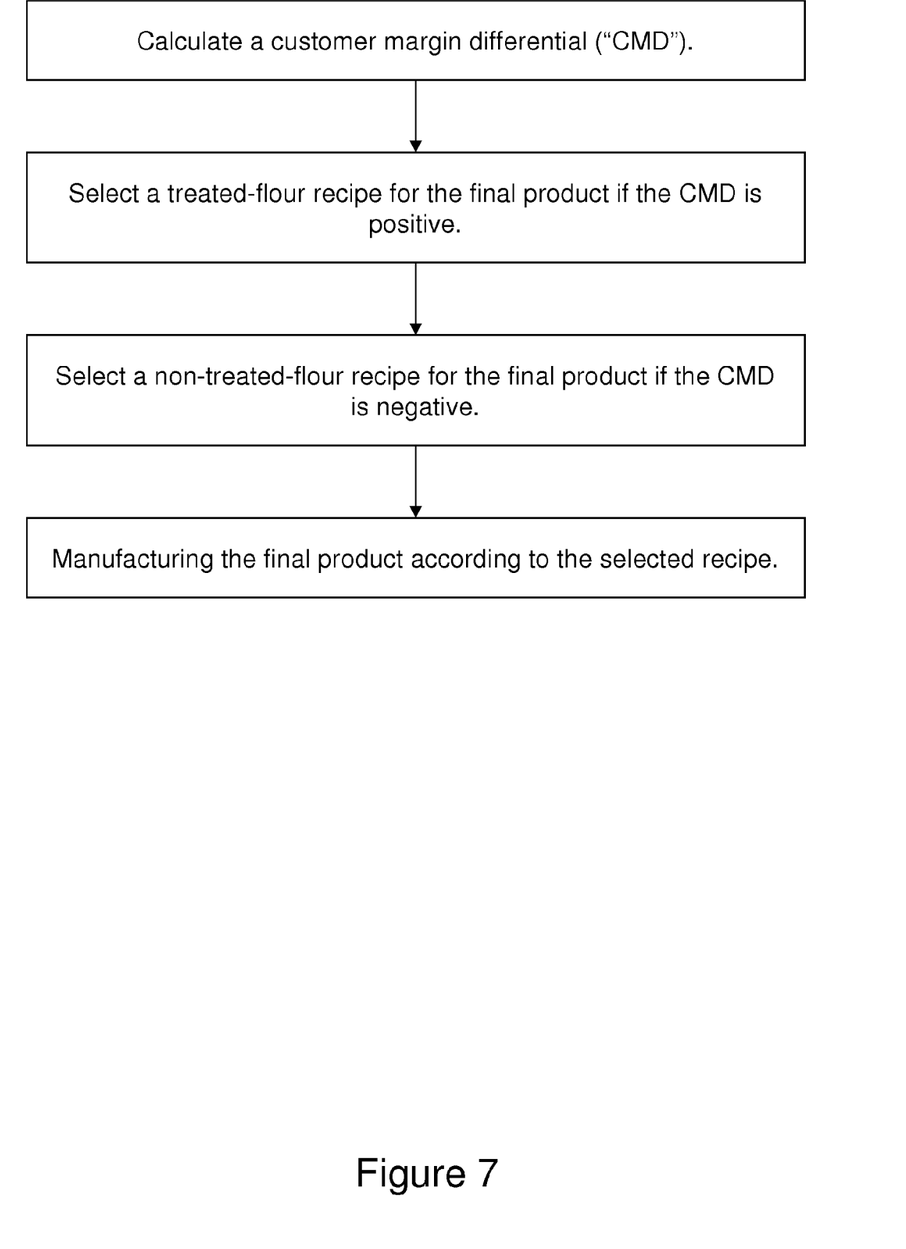
FIG. 7 is a flow chart depicting steps of a method that is in keeping with the invention.
Figure 8:
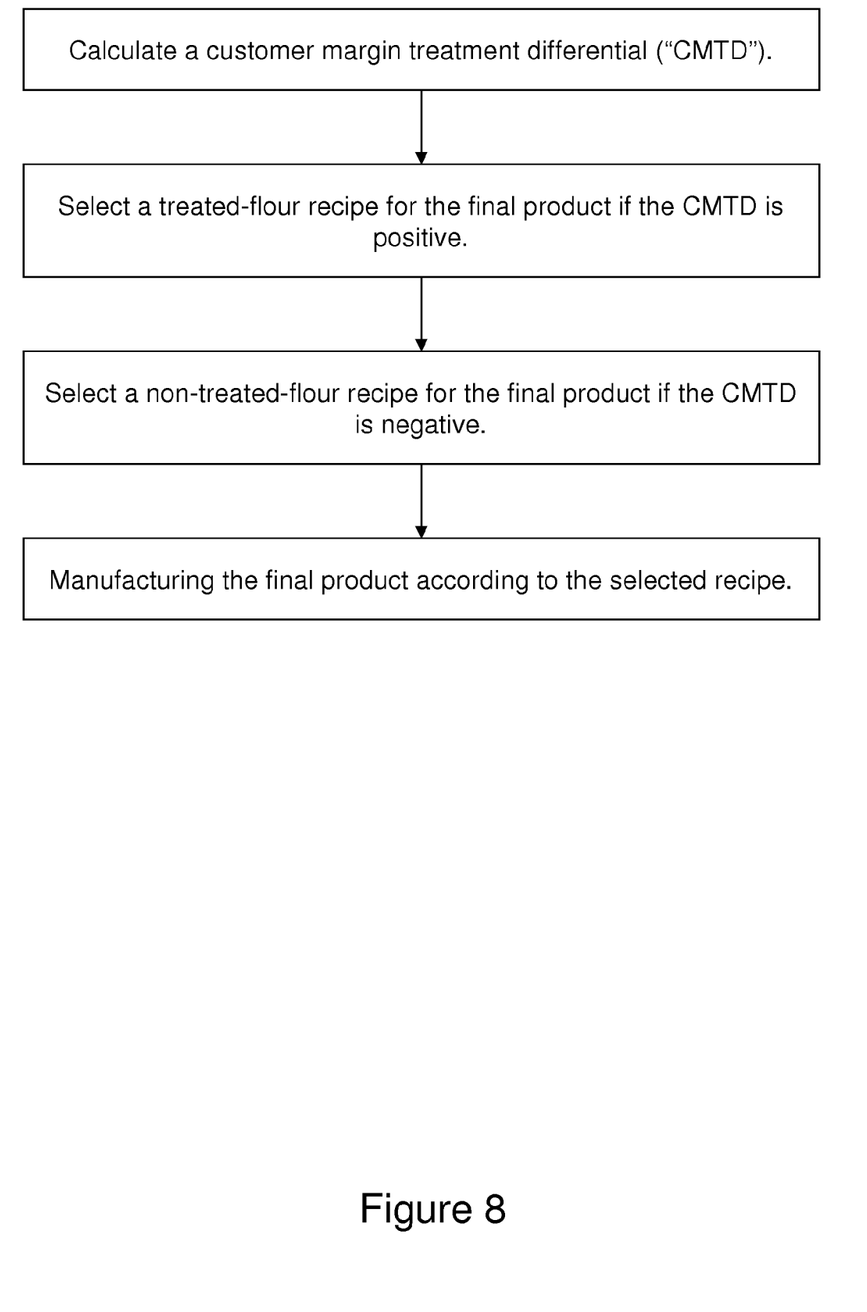
FIG. 8 is a flow chart depicting steps of a method that is in keeping with the invention.

FIG. 6 schematically depicts a system according to the invention. It should now be evident that a method according to the invention can be carried out by a computer having a microprocessor (labeled "µP" in FIG. 4) programmed to determine the CMD, an input device (labeled "I" in FIG. 4) and an output device (labeled "O" in FIG. 4). The input device may be a keyboard or softscreen-type of input device in order to enable a user to input C.f., W.f., C.t.f., and/or W.t.f. and other values needed or helpful for the microprocessor to determine the CMD and thereby provide such values to the microprocessor. The output device may be a monitor which is arranged to display the indication that heat treated flour is selected if the heat-treat signal is provided. The microprocessor also may be programmed to predict W.t.f. in the manner outlined above.

Furthermore, the microprocessor may be programmed to determine whether the CMD is a negative number, and to provide a non-heat treat signal indicating that flour should not be heat treated if the CMD is negative. In that system, the output device is capable of displaying an indication that the flour should not be heat treated if the non-heat treat signal is provided.

FIG. 6 may also be used to illustrate another system according to the invention. The invention also may be embodied as a computer having a microprocessor (labeled "µP" in FIG. 4) programmed to determine the CMTD for purposes of determining whether to heat treat flour. Such a system might be used by a customer to determine whether to heat treat flour in-house. Such a system also may include an input device (labeled "I" in FIG. 4) and an output device (labeled "O" in FIG. 4). The input device and/or the output device may be similar those described above. The microprocessor also may be programmed to predict W.t.f. in the manner outlined above.

Furthermore, the microprocessor may be programmed to determine whether the CMTD is a negative number, and to provide a non-heat treat signal indicating that flour should not be heat treated if the CMTD is negative. In that system, the output device is capable of displaying an indication that the flour should not be heat treated if the non-heat treat signal is provided.

The invention may be embodied as a method for manufacturing a final product from flour and non-flour components. In such a method, a customer margin differential ("CMD") is calculated, a treated-flour recipe for the final product is selected if the CMD is positive or a non-treated-flour recipe is selected for the final product if the CMD is negative, and manufacturing the final product according to the selected recipe. In such a method, calculating the CMD may be carried out by (i) determining a cost ("C1") of untreated flour, which is equal to C.f.×W.f., where C.f. is the cost of untreated flour per unit weight, and W.f. is the weight of untreated flour per unit of final product, (ii) determining a cost ("C2") of treated flour, which is equal to C.t.f.×W.t.f., where C.t.f. is the cost of treated flour per unit weight, and W.t.f. is the weight of treated flour per unit of final product, (iii) determining a cost differential ("C3") of other components, which is equal to the cost of non-flour components used to make the final product when untreated flour is used minus the cost of non-flour components used to make the final product when treated flour is used, (iv) determining a cost differential ("C4") of processing costs, which is equal to the manufacturing cost of producing the final product with untreated flour minus the cost of producing the final product with treated flour, and (v) determining the CMD, which is equal to C1−C2+C3+C4.

Such a method may include determining the weight of the treated flour per unit of final product (W.t.f.) by (a) predicting a change in absorption due to treatment and (b) scaling W.f. according to the change in absorption to provide W.t.f. Predicting the change in absorption may be determined by subtracting an absorption value for non-heat treated flour from a predicted absorption value for heat treated flour, and determining the predicted absorption value for heat treated flour by determining absorption A, where A is:

$$A = A_e - (A_e - A_o)10^{\left[\frac{-t}{D_r \cdot 10^{(T_r - T/z)}}\right]}$$

wherein
A=absorption
$A_o$=initial absorption
$A_e$=maximum absorption achieve at a given temperature and protein content flour:

$$A_e = A_o + 3.2632 e^{0.0044T}$$

Dr=reference decimal value which is 27 min at 260° F. to increase absorption by 90% or one log-cycle
Tr=reference temperature of 260° F.
T=heat treatment temperature between 250-330° F.
z=167° F. and is the temperature change necessary to change the D-value by 90% or one-log cycle.

The invention also may be embodied as a method for manufacturing a final product from flour and non-flour components. This embodiment of the invention may include calculating a customer margin differential ("CMTD"), a treated-flour recipe for the final product is selected if the CMTD is positive or a non-treated-flour recipe is selected for the final product if the CMTD is negative, and manufacturing the final product according to the selected recipe. In such a method, calculating the CMTD may be carried out by (i) determining an incremental cost ("C1"), which is equal to C.f.×(W.f.−W.t.f.), where C.f. is the cost of untreated flour per unit weight, and W.f. is the weight of untreated flour per unit of final product, and W.t.f. is the weight of treated flour per unit of final product, (ii) determining a cost ("C2") of treating flour, which is equal to C.f.t.×W.t.f., where C.f.t. is the cost of treating the flour per unit weight, and W.t.f. is the weight of treated flour per unit of final product, (iii) determining a cost differential ("C3") of other components, which is equal to the cost of non-flour components used to make the final product when untreated flour is used minus the cost of non-flour components used to make the final product when treated flour is used, (iv) determining a cost differential ("C4") of processing costs, which is equal to the manufacturing cost of producing the final product with untreated flour minus the cost of producing the final product with treated flour, and (v) determining the CMTD, which is equal to C1−C2+C3+C4.

Such a method may include determining the weight of the treated flour per unit of final product (W.t.f.) by (a) predicting a change in absorption due to treatment and (b) scaling W.f. according to the change in absorption to provide W.t.f. Predicting the change in absorption may be determined by subtracting an absorption value for non-heat treated flour from a predicted absorption value for heat treated flour, and determining the predicted absorption value for heat treated flour by determining absorption A, where A is:

$$A = A_e - (A_e - A_o)10^{\left[\frac{-t}{D_r \cdot 10^{(T_r - T/z)}}\right]}$$

wherein
A=absorption
$A_o$=initial absorption
$A_e$=maximum absorption achieve at a given temperature and protein content flour:

$$A_e = A_o + 3.2632e^{0.0044T}$$

Dr=reference decimal value which is 27 min at 260° F. to increase absorption by 90% or one log-cycle
Tr=reference temperature of 260° F.
T=heat treatment temperature between 250-330° F.
z=167° F. and is the temperature change necessary to change the D-value by 90% or one-log cycle.

It was noted above that other methods besides heat treatment may be used to denature the flour. Hence, the decisions identified herein may be broadly referred to as being between "treated flour" and "untreated flour" in order not to exclude methods of denaturing flour which are not associated with heat treatment.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of selecting between treated flour and untreated flour, comprising:
providing a microprocessor programmed to determine a customer margin differential ("CMD");
determined the CMD by the microprocessor by:
(a) determining a cost ("C1") of untreated flour, which is equal to C.f.×W.f., where C.f. is the cost of untreated flour per unit weight, and W.f. is the weight of untreated flour per unit of final product;
(b) determining a cost ("C2") of treated flour, which is equal to C.t.f.×W.t.f., where C.t.f. is the cost of treated flour per unit weight, and W.t.f. is the weight of treated flour per unit of final product;
(c) determining a cost differential ("C3") of other components, which is equal to the cost of non-flour components used to make the final product when untreated flour is used minus the cost of non-flour components used to make the final product when treated flour is used;
(d) determining a cost differential ("C4") of processing costs, which is equal to the manufacturing cost of producing the final product with untreated flour minus the cost of producing the final product with treated flour;
(e) determining the CMD, which is equal to C1−C2+C3+C4;
determining whether the CMD is a positive number or not a positive number;
indicating selection of treated flour when it is determined that the CMD is a positive number.

2. The method of claim 1, wherein the microprocessor is programmed to determine whether the CMD is a positive number, and determining whether the CMD is a positive number is accomplished by operating the microprocessor so that a determination is made as to whether the CMD is a positive number.

3. The method of claim 1, wherein the microprocessor is programmed to indicate selection of treated flour if the CMD is a positive number, and indicating selection of treated flour is accomplished by operating the microprocessor so that selection of treated flour is indicated when it is determined that the CMD is determined to be a positive number.

4. The method of claim 1, further comprising determining the weight of the treated flour per unit of final product (W.t.f.) by (a) predicting a change in absorption due to treatment and (b) scaling W.f. according to the change in absorption to provide W.t.f.

5. The method of claim 4, wherein the change in absorption is determined by a microprocessor programmed to subtract an absorption value for non-heat treated flour from a predicted absorption value for heat treated flour, and the microprocessor is programmed to determine the predicted absorption value for heat treated flour by determining absorption A, where A is:

$$A = A_e - (A_e - A_o)10^{\left[\frac{-t}{D_r \cdot 10^{(T_r - T/z)}}\right]}$$

wherein
A=absorption
$A_0$=initial absorption
$A_e$=maximum absorption achieve at a given temperature and protein content flour:

$$A_e = A_o + 3.2632e^{0.0044T}$$

Dr=reference decimal value which is 27 min at 260° F. to increase absorption by 90% or one log-cycle
Tr=reference temperature of 260° F.
T=heat treatment temperature between 250-330° F.
z=167° F. and is the temperature change necessary to change the D-value by 90% or one-log cycle.

6. The method of claim 1, further comprising:
determining whether the CMD is a negative number or not a negative number;
indicating selection of untreated flour when it is determined that the CMD is a negative number.

7. The method of claim 6, wherein the microprocessor is programmed to indicate selection of untreated flour if the CMD is a negative number, and indicating selection of treated flour is accomplished by operating the microprocessor so that selection of untreated flour is indicated when it is determined that the CMD is determined to be a negative number.

8. A method of determining whether to treat flour, comprising:
providing a microprocessor programmed to determine a customer margin treatment differential ("CMTD");
determined the CMTD by the microprocessor by:
(a) determining an incremental cost ("C1"), which is equal to C.f.×(W.f.−W.t.f.), where C.f. is the cost of untreated flour per unit weight, and W.f. is the weight of untreated flour per unit of final product, and W.t.f. is the weight of treated flour per unit of final product;
(b) determining a cost ("C2") of treating flour, which is equal to C.f.t.×W.t.f., where C.f.t. is the cost of treating the flour per unit weight, and W.t.f. is the weight of treated flour per unit of final product;
(c) determining a cost differential ("C3") of other components, which is equal to the cost of non-flour components used to make the final product when untreated flour is used minus the cost of non-flour components used to make the final product when treated flour is used;
(d) determining a cost differential ("C4") of processing costs, which is equal to the manufacturing cost of producing the final product with untreated flour minus the cost of producing the final product with treated flour;
(e) determining the CMTD, which is equal to C1−C2+C3+C4;
determining whether the CMTD is a positive number or not a positive number;
indicating a determination to treat flour when it is determined that the CMTD is a positive number.

9. The method of claim 8, wherein the microprocessor is programmed to determine whether the CMTD is a positive number, and determining whether the CMTD is a positive number by operating the microprocessor so that a determination is made as to whether the CMTD is a positive number.

10. The method of claim 8, wherein the microprocessor is programmed to indicate the determination to treat flour if the CMTD is a positive number, and the determination to treat flour is accomplished by operating the microprocessor so that indicating the determination to treat flour is indicated when it is determined that the CMTD is determined to be a positive number.

11. The method of claim 8, further comprising determining the weight of the treated flour per unit of final product (W.t.f.) by (a) predicting a change in absorption due to treatment and (b) scaling W.f. according to the change in absorption to provide W.t.f.

12. The method of claim 9, wherein the change in absorption is determined by a microprocessor programmed to subtract the absorption of non-heat treated flour from a predicted absorption value for heat treated flour, and the microprocessor is programmed to determine the predicted absorption value for the heat treated flour by determining absorption A, where A is:

$$A = A_e - (A_e - A_o)10^{\left[\frac{-t}{D_r \cdot 10^{(T_r - T/z)}}\right]}$$

wherein
A=absorption
$A_o$=initial absorption $A_e$=maximum absorption achieve at a given temperature and protein content flour:

$$A_e = A_o + 3.2632e^{0.0044T}$$

Dr=reference decimal value which is 27 min at 260° F. to increase absorption by 90% or one log-cycle Tr=reference temperature of 260° F.

T=heat treatment temperature between 250-330° F.

z=167° F. and is the temperature change necessary to change the D-value by 90% or one-log cycle.

13. The method of claim 8, further comprising:
determining whether the CMTD is a negative number or not a negative number;
indicating a determination not to treat flour when it is determined that the CMTD is a negative number.

14. A system for selecting between treated flour and untreated flour, comprising:
a microprocessor programmed to determine a customer margin differential ("CMD"), the CMD being determined by the microprocessor doing the following:
(a) determine a cost ("C1") of untreated flour, which is equal to C.f.×W.f., where C.f. is the cost of untreated flour per unit weight, and W.f. is the weight of untreated flour per unit of final product;
(b) determine a cost ("C2") of treated flour, which is equal to C.t.f.×W.t.f., where C.t.f. is the cost of treated flour per unit weight, and W.t.f. is the weight of treated flour per unit of final product;
(c) determine a cost differential ("C3") of other components, which is equal to the cost of non-flour components used to make the final product when untreated flour is used minus the cost of non-flour components used to make the final product when treated flour is used;
(d) determine a cost differential ("C4") of processing costs, which is equal to the manufacturing cost of producing the final product with untreated flour minus the cost of producing the final product with treated flour;
(e) determine the CMD, which is equal to C1−C2+C3+C4;
(f) determine whether the CMD is a positive number or not a positive number;
(g) provide a signal indicating selection of treated flour if the CMD is determined to be a positive number;
an input device capable of receiving values required by the microprocessor to determine the CMD;
an output device capable of displaying an indication that treated flour is selected when it is determined that the signal is provided.

15. The system of claim 14, further comprising determining the weight of the treated flour per unit of final product (W.t.f.) by (a) predicting a change in absorption due to treatment and (b) scaling W.f. according to the change in absorption to provide W.t.f.

16. The system of claim 15, wherein the change in absorption is determined by the microprocessor, and the microprocessor is programmed to subtract an absorption value for non-heat treated flour from a predicted absorption value for heat treated flour, and the microprocessor is programmed to determine the predicted absorption value for heat treated flour by determining absorption A, where A is:

$$A = A_e - (A_e - A_o)10^{\left[\frac{-t}{D_r \cdot 10^{(T_r - T/z)}}\right]}$$

wherein
A=absorption
$A_o$=initial absorption
$A_e$=maximum absorption achieve at a given temperature and protein content flour:

$$A_e = A_o + 3.2632e^{0.0044T}$$

Dr=reference decimal value which is 27 min at 260° F. to increase absorption by 90% or one log-cycle
Tr=reference temperature of 260° F.
T=heat treatment temperature between 250-330° F.
z=167° F. and is the temperature change necessary to change the D-value by 90% or one-log cycle.

17. The system of claim 14, wherein the microprocessor is programmed to determine whether the CMD is a negative number or not a negative number, and to provide an untreated flour signal indicating selection of untreated flour when it is determined that the CMD is negative.

18. The system of claim 17, wherein the output device is capable of displaying an indication that untreated flour is selected when it is determined that the untreated flour signal is provided.

19. A system for determining whether to treat flour, comprising:
a microprocessor programmed to determine a customer margin treatment differential ("CMTD"), the CMTD being determined by the microprocessor doing the following:
 (a) determine an incremental cost ("C1"), which is equal to C.f.×(W.f.−W.t.f.), where C.f. is the cost of untreated flour per unit weight, and W.f. is the weight of untreated flour per unit of final product, and W.t.f. is the weight of treated flour per unit of final product;
 (b) determine a cost ("C2") of treating flour, which is equal to C.f.t.×W.t.f., where C.f.t. is the cost of treating the flour per unit weight, and W.t.f. is the weight of treated flour per unit of final product;
 (c) determine a cost differential ("C3") of other components, which is equal to the cost of non-flour components used to make the final product when untreated flour is used minus the cost of non-flour components used to make the final product when treated flour is used;
 (d) determine a cost differential ("C4") of processing costs, which is equal to the manufacturing cost of producing the final product with untreated flour minus the cost of producing the final product with treated flour;
 (e) determine the CMTD, which is equal to C1−C2+C3+C4;
 (f) determine whether the CMTD is a positive number or not a positive number; and
 (g) provide a treated flour signal, indicating a determination to treat flour, if the CMTD is positive;
an input device capable of receiving values required by the microprocessor to determine the CMTD;
an output device capable of indicating a determination to treat flour when it is determined that the treated flour signal is provided.

20. The system of claim 19, further comprising determining the weight of the treated flour per unit of final product (W.t.f.) by (a) predicting a change in absorption due to treatment and (b) scaling W.f. according to the change in absorption to provide W.t.f.

21. The system of claim 20, wherein the change in absorption is determined by the microprocessor, and the microprocessor is programmed to subtract the absorption of non-heat treated flour from a predicted absorption value for heat treated flour, and the microprocessor is programmed to determine the predicted absorption value for the heat treated flour by determining absorption A, where A is:

$$A = A_e - (A_e - A_o)10^{\left[\frac{-t}{D_r \cdot 10^{(T_r - T/z)}}\right]}$$

wherein
A=absorption
$A_o$=initial absorption
$A_e$=maximum absorption achieve at a given temperature and protein content flour:

$$A_e = A_o + 3.2632e^{0.0044T}$$

Dr=reference decimal value which is 27 min at 260° F. to increase absorption by 90% or one log-cycle
Tr=reference temperature of 260° F.
T=heat treatment temperature between 250-330° F.
z=167° F. and is the temperature change necessary to change the D-value by 90% or one-log cycle.

22. The system of claim 19, wherein the microprocessor is programmed to determine whether the CMTD is a negative number or not a negative number, and to provide an untreated flour signal, indicating a determination not to treat flour, when it is determined that the CMTD is negative.

23. The system of claim 22, wherein the output device is capable of displaying an indication that untreated flour has been determined when it is determined that the untreated flour signal is provided.

24. A method for manufacturing a final product from flour and non-flour components, comprising the steps of:
 (a) calculating by a microprocessor a customer margin differential ("CMD") by:
  (i) determining a cost ("C1") of untreated flour, which is equal to C.f.×W.f., where C.f. is the cost of untreated flour per unit weight, and W.f. is the weight of untreated flour per unit of final product;
  (ii) determining a cost ("C2") of treated flour, which is equal to C.t.f.×W.t.f., where C.t.f. is the cost of treated flour per unit weight, and W.t.f. is the weight of treated flour per unit of final product;
  (iii) determining a cost differential ("C3") of other components, which is equal to the cost of non-flour components used to make the final product when untreated flour is used minus the cost of non-flour components used to make the final product when treated flour is used;
  (iv) determining a cost differential ("C4") of processing costs, which is equal to the manufacturing cost of producing the final product with untreated flour minus the cost of producing the final product with treated flour; and
  (v) determining the CMD, which is equal to C1−C2+C3+C4;
 (b) selecting a treated-flour recipe for the final product if the CMD is positive or a non-treated-flour recipe for the final product if the CMD is negative; and (c) manufacturing the final product according to the selected recipe, the final product comprising treated-flour if a treated-flour recipe is selected and the final product comprising non-treated-flour if a non-treated-flour recipe is selected.

25. The method of claim 24, further comprising determining the weight of the treated flour per unit of final product (W.t.f.) by (a) predicting a change in absorption due to treatment and (b) scaling W.f. according to the change in absorption to provide W.t.f.

26. The method of claim 25, wherein the change in absorption is determined by subtracting an absorption value for non-heat treated flour from a predicted absorption value for heat treated flour, and determining the predicted absorption value for heat treated flour by determining absorption A, where A is:

$$A = A_e - (A_e - A_o)10^{\left[\frac{-t}{D_r \cdot 10^{(T_r - T/z)}}\right]}$$

wherein
A=absorption
$A_o$=initial absorption
$A_e$=maximum absorption achieve at a given temperature and protein content flour:

$$A_e = A_o + 3.2632e^{0.0044T}$$

Dr=reference decimal value which is 27 min at 260° F. to increase absorption by 90% or one log-cycle
Tr=reference temperature of 260° F.
T=heat treatment temperature between 250-330° F.
z=167° F. and is the temperature change necessary to change the D-value by 90% or one-log cycle.

27. A method for manufacturing a final product from flour and non-flour components, comprising the steps of:
(a) calculating by a microprocessor a customer margin treatment differential ("CMTD") by:
  (i) determining an incremental cost ("C1"), which is equal to C.f.×(W.f.−W.t.f.), where C.f. is the cost of untreated flour per unit weight, and W.f. is the weight of untreated flour per unit of final product, and W.t.f. is the weight of treated flour per unit of final product;
  (ii) determining a cost ("C2") of treating flour, which is equal to C.f.t.×W.t.f., where C.f.t. is the cost of treating the flour per unit weight, and W.t.f. is the weight of treated flour per unit of final product;
  (iii) determining a cost differential ("C3") of other components, which is equal to the cost of non-flour components used to make the final product when untreated flour is used minus the cost of non-flour components used to make the final product when treated flour is used;
  (iv) determining a cost differential ("C4") of processing costs, which is equal to the manufacturing cost of producing the final product with untreated flour minus the cost of producing the final product with treated flour; and
  (v) determining the CMTD, which is equal to C1−C2+C3+C4;
(b) selecting a treated-flour recipe for the final product if the CMTD is positive or a non-treated-flour recipe for the final product if the CMTD is negative; and
(c) manufacturing the final product according to the selected recipe.

28. The method of claim 27, further comprising determining the weight of the treated flour per unit of final product (W.t.f.) by (a) predicting a change in absorption due to treatment and (b) scaling W.f. according to the change in absorption to provide W.t.f.

29. The method of claim 28, wherein the change in absorption is determined by subtracting an absorption value for non-heat treated flour from a predicted absorption value for heat treated flour, and determining the predicted absorption value for heat treated flour by determining absorption A, where A is:

$$A = A_e - (A_e - A_o)10^{\left[\frac{-t}{D_r \cdot 10^{(T_r - T/z)}}\right]}$$

wherein
A=absorption
$A_o$=initial absorption
$A_e$=maximum absorption achieve at a given temperature and protein content flour:

$$A_e = A_o + 3.2632e^{0.0044T}$$

Dr=reference decimal value which is 27 min at 260° F. to increase absorption by 90% or one log-cycle
Tr=reference temperature of 260° F.
T=heat treatment temperature between 250-330° F.
z=167° F. and is the temperature change necessary to change the D-value by 90% or one-log cycle.

* * * * *